United States Patent [19]
Deng

[11] Patent Number: 5,939,991
[45] Date of Patent: Aug. 17, 1999

[54] CIRCUIT BREAKER WITH CURRENT LEVEL INDICATOR

[75] Inventor: Kan Deng, Salisbury, Md.

[73] Assignee: Eaton Corporation, Cleveland, Ohio

[21] Appl. No.: 08/735,162

[22] Filed: Oct. 22, 1996

[51] Int. Cl.$^6$ .................................................. G08B 21/00
[52] U.S. Cl. ........................ 340/638; 340/662; 340/664; 335/17; 361/86
[58] Field of Search .................................. 340/638, 524, 340/639, 635, 644, 455, 662, 664, 663, 687; 324/96; 335/17 A; 361/86

[56] References Cited

U.S. PATENT DOCUMENTS

| | | | |
|---|---|---|---|
| 4,250,501 | 2/1981 | Pakrandt | 340/664 |
| 4,351,013 | 9/1982 | Matsko et al. | 361/96 |
| 4,584,545 | 4/1986 | Nagel | 335/41 |
| 4,945,345 | 7/1990 | Proctor et al. | 340/639 |
| 4,969,063 | 11/1990 | Scott et al. | 361/96 |
| 5,012,495 | 4/1991 | Munroe et al. | 337/3 |
| 5,051,731 | 9/1991 | Guim et al. | 340/638 |
| 5,107,202 | 4/1992 | Renda | 324/96 |
| 5,220,478 | 6/1993 | Innes et al. | 361/93 |
| 5,233,330 | 8/1993 | Hase | 340/638 |
| 5,353,014 | 10/1994 | Carroll et al. | 340/638 |
| 5,373,411 | 12/1994 | Grass et al. | 361/64 |
| 5,493,278 | 2/1996 | Mackenzie et al. | 340/638 |
| 5,581,218 | 12/1996 | Bagalini et al. | 335/17 |
| 5,626,680 | 5/1997 | Makhija | 340/664 |
| 5,656,931 | 8/1997 | Lau et al. | 324/522 |
| 5,710,513 | 1/1998 | March | 324/424 |

OTHER PUBLICATIONS

Article entitled "High-side Current Sense Causes Little Error" by Charles L. Langner, p. 41 EDN Design Ideas, date unknown, admitted prior art.

*Primary Examiner*—Jeffery A. Hofsass
*Assistant Examiner*—Davetta Woods
*Attorney, Agent, or Firm*—Quarles & Brady LLP

[57] ABSTRACT

A circuit breaker has line and load terminals and a mechanism which indicates the magnitude of current flowing through the circuit breaker. The mechanism includes a current sensing resistor coupled between the supply and load terminals. An amplifier is coupled to the current sensing resistor and produces a first output signal corresponding to the current magnitude. A first light emitting diode is energized by the first output signal. A first comparator is coupled to the amplifier and produces illumination of a second light emitting diode when the first output signal exceeds a first reference voltage level. A third light emitting diode is illuminated by a second comparator when the first output signal exceeds a second reference voltage level. Thus the number of light emitting diodes that are illuminated indicates the relative level of current conducted by the circuit breaker.

17 Claims, 2 Drawing Sheets

CIRCUIT BREAKER WITH CURRENT LEVEL INDICATOR

BACKGROUND OF THE INVENTION

The present invention relates circuit breakers for interrupting the supply of current to a load when the current magnitude exceeds a predefined safety threshold; and particularly to circuit breakers with integral current level indicators.

Circuit breakers are commonly used to prevent excessive over current conditions from damaging electrical components or causing a fire. A wide variety of circuit breakers are available for both AC and DC applications and are connected between an electrical load and the current supply. Such devices include a mechanism for responding to an excessive current flowing through the device by opening a set of contacts, thereby disconnecting the load from the current supply.

In certain applications, it is desired that the circuit breaker provide an indication of the magnitude of current flowing to the load. Previous circuit breakers, such as the one described in U.S. Pat. No. 4,584,545, incorporated a calibrated resistive shunt in series with the set of contacts wherein current supplied to the load was conducted through the shunt. Terminals were provided so that an external voltmeter could be connected to measure a voltage across the shunt that was proportional to the current flowing to the load. Thus the shunt voltage measurement indicated the magnitude of current being conducted by the circuit breaker. These circuit breakers did not directly provide a current level indication as an external voltmeter was required.

In many circuit breakers applications, an indication of the exact amount of current being conducted is not required. Instead, a relative indication of the current magnitude with respect to the maximum rating, or trip current threshold level, is all that is necessary. Thus a precise voltmeter need not be incorporated into the circuit breaker.

SUMMARY OF THE INVENTION

A general object of the present invention is to provide a circuit breaker with an integral mechanism for indicating the level of current being conducted through the circuit breaker.

Another object is to provide a mechanism for indicating the relative magnitude of the current with respect to the maximum current rating for the circuit breaker.

A further object of the present invention is to provide the current sensing mechanism which easily can be adapted for incorporation into circuit breakers of different nominal current ratings.

Yet another object of the present invention is to provide a current sensing mechanism which is relatively insensitive to temperature variations.

A current level indicator for a circuit breaker includes a current sensor, such as a calibrated resistor, connected between line and load terminals of the circuit breaker. The sensor provides a signal which corresponds to the magnitude of load current flowing between the line and load terminals. An amplifier, connected to the current sensor, amplifies the signal to a usable level thereby producing a first output signal. In the preferred embodiment, the load current flows through a very small value, current sensing resistor wherein voltage developed across that resistor corresponds to the load current magnitude. That voltage is amplified to a level which can be utilized by the remainder of the circuitry for the current level indicator.

A first light emitter is coupled to the amplifier and is illuminated when the first output signal exceeds a first voltage level. Preferably the intensity of the illumination corresponds to the level of the first output signal and thus to the load current magnitude.

A first comparator is connected to the amplifier and produces a second output signal when the first output signal exceeds a second voltage level which is greater than the first voltage level. A second light emitter is coupled to the first comparator to be illuminated in response to the second output signal. A second comparator is connected to the amplifier and emits a third output signal when the first output signal exceeds a third voltage level which is greater than the second voltage level. The third output signal drives a third light emitter which is illuminated in response to the third output signal.

The number of light emitters that are illuminated and the brightness of the first light emitter indicate the magnitude of the load current flowing through the circuit breaker.

DETAILED DESCRIPTION OF THE INVENTION

Figure 1:
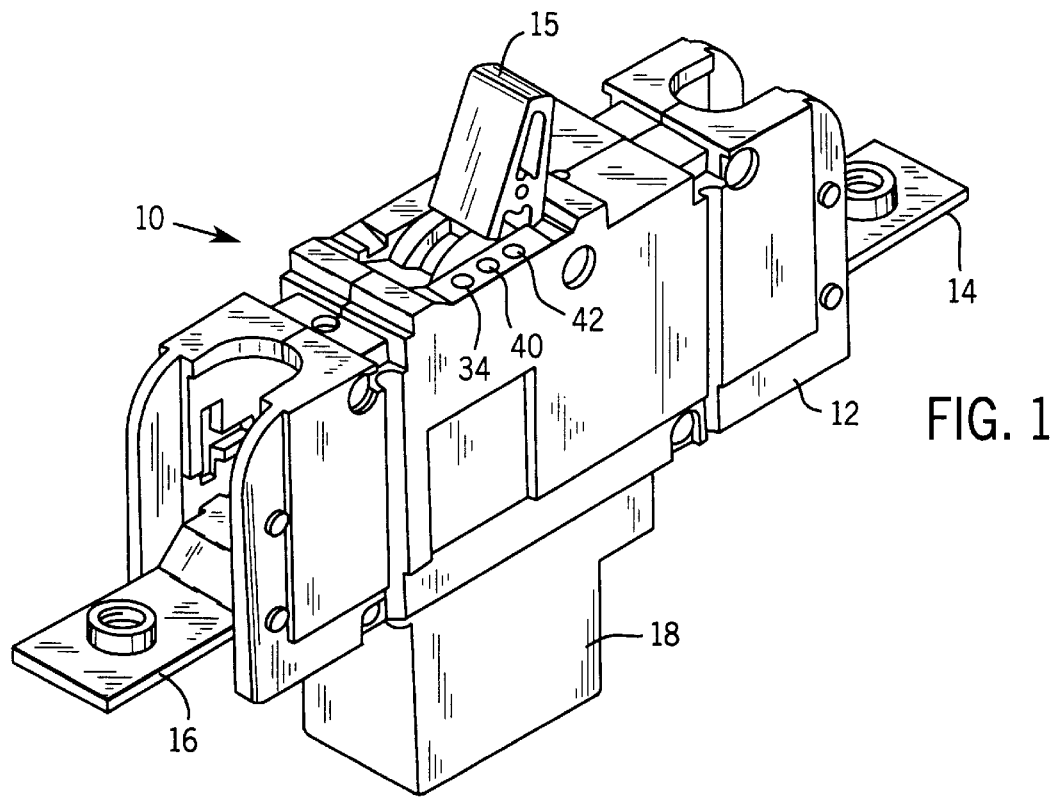
FIG. 1 is an isometric view of a single pole, single section circuit breaker incorporating the present invention.

With initial reference to FIG. 1, a single pole, direct current circuit breaker 10 has a housing 12. The housing 12 encloses a conventional electromagnetic sensing device and switch contacts similar to those utilized in the circuit breakers described in U.S. Pat. No. 4,584,545, which description is incorporated herein by reference. The circuit breaker 10 has a line terminal 14 which in use is connected to the source of direct current (DC) and has a load terminal 16 which in use is connected to the DC electrical load being protected by the circuit breaker 10. The circuit breaker 10 has a handle 15 for manually operating the switch contacts within housing 12 and resetting the circuit breaker in the event of a trip condition.

Figure 2:
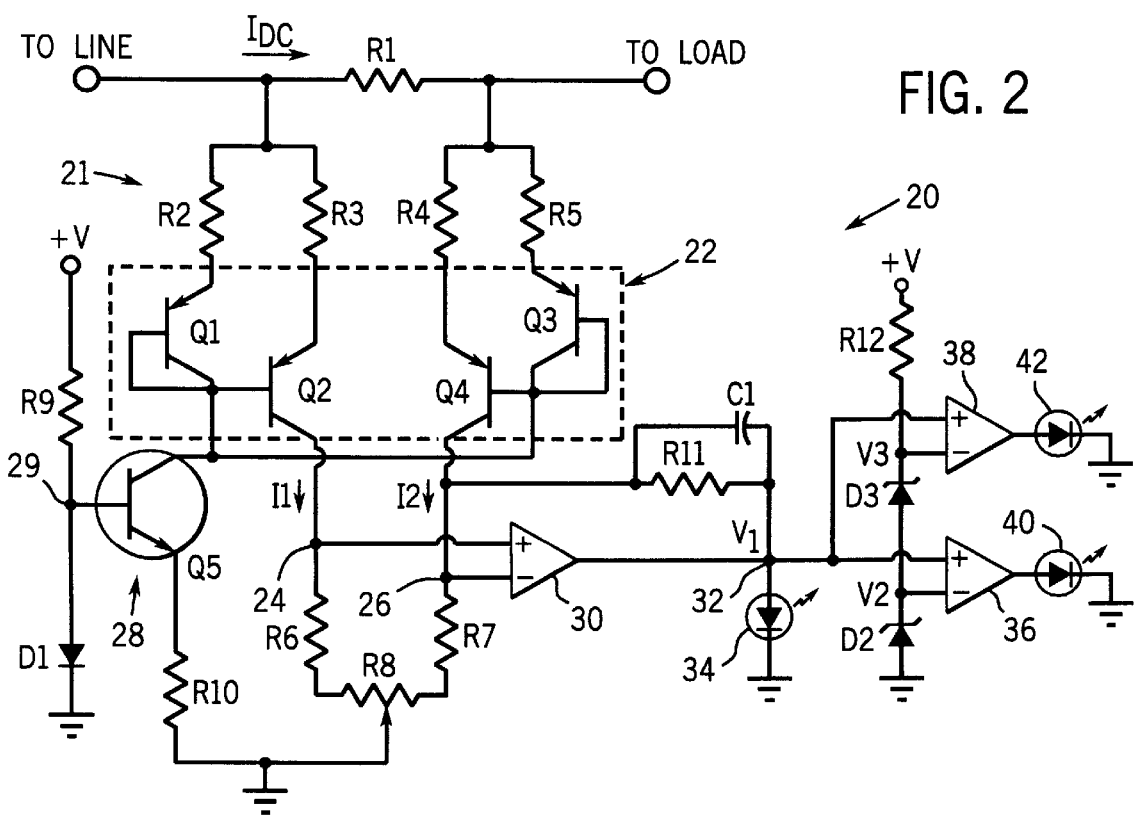
FIG. 2 is a schematic circuit diagram of a current level sensing and indicating circuit which is incorporated into the circuit breaker of FIG. 1.

The housing 12 also includes a portion 18 which encloses a circuit 20 shown in FIG. 2 for sensing and indicating the magnitude of current flowing between the line and load terminals 14 and 16. The circuit 20 has a current sensing resistor R1, of approximately ten milli-ohms, connected in series with the circuit breaker contacts between the line and load terminals 14 and 16 so that the direct current $I_{DC}$ flowing between those terminals also flows through the current sensing resistor. The current sensing resistor R1 has a precisely known resistance and may be a calibrated shunt device of the type described in the aforementioned U.S. patent. The current sensing and indicating circuit 20 is able to measure direct current flowing between the supply and load terminals 14 and 16 without requiring a large voltage drop across the current sensing resistor R1 and thus producing relatively low power dissipation in that resistor. Nevertheless, the current sensing resistor R1 preferably is made of a low temperature coefficient resistive material, such as maganain copper which has a temperature coefficient of $1.8 \times 10^{-5}$. The use of such low temperature coefficient resistance material in resisttor R1 renders the current sensing circuit 20 relatively insensitive to temperature variation which result from heat generated by the current flow. Alternatively or additionally, sensing and indicating circuit 20 may include a temperature compensation mechanism, as will be described.

The voltage drop across current sensing resistor R1 is amplified by an amplifier subcircuit 21 comprising four equal value resistors R2, R2, R4 and R5 and a network 22 of four PNP transistors Q1, Q2, Q3 and Q4 that are thermally coupled in a common integrated circuit package. Transistor Q1 is connected as a diode and resistor R2 couples the emitter of transistor Q1 to the line side of the current sensing resistor R1. The base and collector of transistor Q1 are directly connected together and to the base of transistor Q2. Transistor Q2 has an emitter coupled by resistor R3 to the line side of the current sensing resistor R1. The collector of transistor Q1 is connected to a first amplifier node 24. Another pair of transistors Q3 and Q4 within network 22 are connected in a similar manner to the load side of the current sensing resistor R1. Specifically, resistor R5 connects the load side of the current sensing resistor R1 to the emitter of transistor Q3 which functions as a diode due to the direct connection of its base and collector. The base and collector of transistor Q3 are directly connected to the base of transistor Q4 which has an emitter that is coupled by resistor R4 to the load side of the current sensing resistor R1. The collector of transistor Q4 is coupled to a second amplifier node 26.

Transistors Q2 and Q4 form a matched transistor pair that provides common-mode rejection and converts the voltage that is developed across current sensing resistor R1 to a differential current, i.e. the difference between output currents I1 and I2 flowing into amplifier nodes 24 and 26, respectively. The amplifier nodes 24 and 26 are coupled to ground by a resistor network formed by fixed resistors R6 and R7 each connected between a different node 24 or 26 and an end of potentiometer R8 which has a wiper connected to ground.

A temperature compensated current source 28 is provided by resistor R9 and diode D1 connected in series between ground and a source of positive voltage +V for circuit 20. The node 29 between resistor R9 and diode D1 is connected to the base of an NPN transistor Q5 with an emitter coupled to ground by resistor R10. The collector of transistor Q5 is coupled to the bases of transistors Q2 and Q4. Thus transistor Q5 and diode D1 form a temperature compensated current source that produces an output which is applied to bases of transistors Q2 and Q4. The diode connected transistors Q1 and Q3 act as current mirrors for associated transistors Q2 and Q4, stabilizing the latter transistors quiescent collector currents. Setting the emitter of the temperature compensating transistor Q5 at ground potential produces a virtual ground at both amplifier nodes 24 and 26 via the current mirror action, thereby establishing the first reference (zero load current) voltage.

An operational amplifier 30 has a non-inverting input connected to the first amplifier node 24 and an inverting input connected to the second amplifier node 26. The operational amplifier 30 acts as a differential current-to-voltage converter providing a single-ended output signal V1 which is proportional to the current flowing through the current sensing resistor R1. The operational amplifier 30 has a feedback resistor R11 which sets the amplifier gain and variable resistor R8 provides an offset trim. A capacitor C1 is placed in parallel with feedback resistor R11 to provide a noise filter.

The operational amplifier 30 produces an output signal at node 32 which has a voltage V1 that varies in proportion to the magnitude of current $I_{DC}$ flowing through the current sensing resistor R1. A first light emitting diode (LED) 34 is connected between the output node 32 and ground so as to be energized by the output signal from the operational amplifier 30. As a consequence, the first LED 34 illuminates when load current begins flowing through the current sensing resistor R1 and the illumination intensity varies in correspondence with the load current magnitude.

The output node 32 of the operational amplifier 30 is connected to the non-inverting inputs of two differential amplifiers 36 and 38. The inverting inputs of those differential amplifiers 36 and 38 are connected to a voltage divider formed by the series connection of resistor 12 and Zener diodes D2 and D3 between the positive voltage supply and ground. The voltage divider produces two reference voltages V2 and V3 which are applied respectively to the two differential amplifiers 36 and 38. The output of the first differential amplifier 36 energizes a second LED 40 and the output of the second differential amplifier 38 energizes a third LED 42. The three light emitting diodes 34, 40 and 42 are mounted in holes of the circuit breaker housing 12, as shown in FIG. 1.

Referring still to FIG. 2, the output of differential amplifier 36 goes positive when the voltage V1 of the output signal produced by operational amplifier 30 exceeds the second reference voltage V2. For example, this second reference voltage V2 is selected to correspond to the voltage V1 produced at the output of operational amplifier 30 when the load current flowing through the current sensing resistor R1 is approximately 80 percent of the maximum rated current for the circuit breaker 10. Similarly, the output of the second differential amplifier 38 goes positive and illuminates the third LED 42 when the output voltage V1 of operational amplifier 30 exceeds the third reference voltage V3. Third reference voltage V3 corresponds to the voltage V1 produced at output node 32 when the load current is approximately 100 percent of the maximum rated current for circuit breaker 10.

Therefore, when load current begins flowing through the circuit breaker between line terminal 14 and load terminal 16, the first LED 34 illuminates and the light intensity increases as the load current increases in magnitude. When this load current rises to 80 percent of the maximum rated current for the circuit breaker 10, the second LED 40 illuminates and remains on as long as the current is above that 80 percent threshold. Should the current through the circuit breaker 10 reach 100 percent of the maximum rated level, the third LED 42 will illuminate. If the current flow drops below the 100 percent maximum rated current level, the third LED will be de-energized. Because the second and third light emitting diodes 40 and 42 are driven by differential amplifiers 36 and 38, the illumination will not vary with changes on load current magnitude, unlike the first LED 34. The number of LED's that are illuminated and the brightness of the first LED 34 indicate the magnitude of the load current flowing through the circuit breaker.

Figure 3:
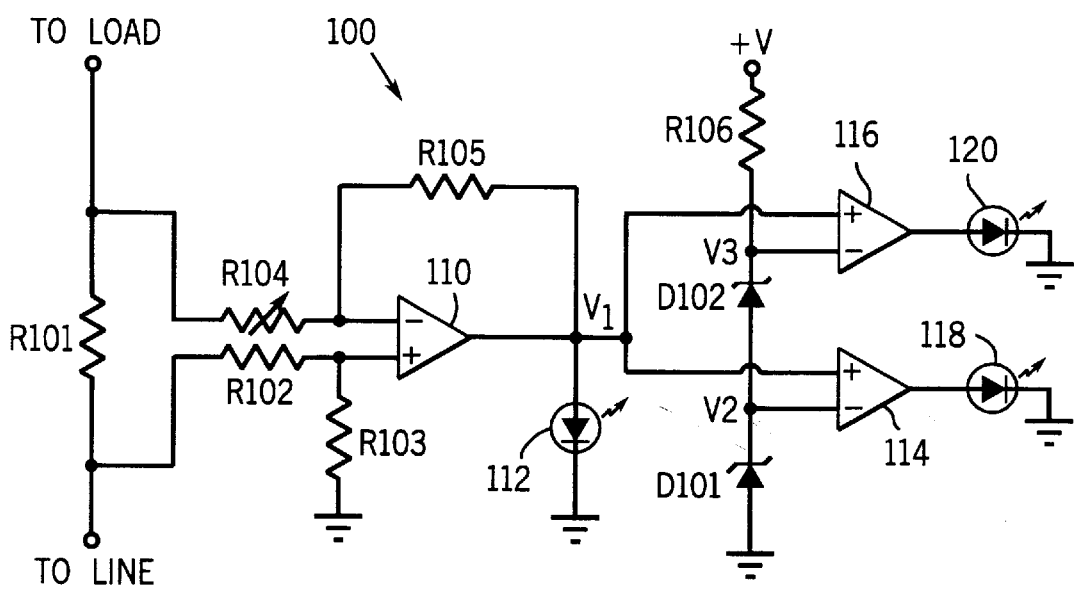
FIG. 3 is an alternative embodiment of the current level sensing and indicating circuit.

FIG. 3 illustrates an alternative embodiment of the current level sensing and indicating circuit. This circuit 100 utilizes a current sensing resistor R101 that is connected between the line terminal 14 and the load terminal 16 of the circuit breaker 10. This current sensing and indicating circuit 100 does not have a temperature compensation network and thus utilizes a current sensing resistor R101 with a relatively low temperature coefficient of resistivity, as described previously. An operational amplifier 110 has an non-inverting input coupled to the line side of the current sensing resistor R101 by a fixed resistor R102 and is coupled to ground potential by resistor R103. The inverting input of operational amplifier 110 is coupled by a variable resistor R104 to the load side of the current sensing resistor R101. A feedback resistor R105 connects the output of operational amplifier 110 to the inverting input. A first light emitting diode 112 is connected between the output of the operational amplifier 110 and ground.

A pair of differential amplifiers 114 and 116 have non-inverting inputs connected directly to the output of the operational amplifier 110. The inverting inputs of the two differential amplifiers 114 and 116 are connected to different points on a voltage divider formed by resistor R106 and Zener diodes D101 and D102. The voltage divider produces two reference voltages V2 and V3 that respectively are applied to the inverting inputs the differential amplifiers 114 and 116. The differential amplifier outputs are connected to second and third light emitting diodes 118 and 120 respectively.

This embodiment functions in a similar manner to that described with the previous circuit 20 shown in FIG. 2 in that when the load current flows through the current sensing resistor R101, the first LED 112 is illuminated and varies in intensity with the variation in load current magnitude. When the load current rises above a level at which the output voltage of the operational amplifier 110 exceeds reference voltage V2, the second LED 118 is energized. Similarly when the load current level produces a even higher output voltage from the operational amplifier 110 which exceeds reference voltage V3, the third LED 120 illuminates. Thus the user by viewing the number of LED's 112, 118 and 120 which are illuminated can determine the relative magnitude of the load current flowing through the circuit breaker 100.

Although both the first and second embodiments of the present invention have been described in the context of three light emitting diodes, a skilled artisan will appreciate that additional reference voltages, differential amplifiers and light emitting diodes can be incorporated to indicate finer current level gradations.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

I claim:
1. A circuit breaker comprising:
   a line terminal;
   a load terminal;
   a switch coupling the line terminal to the load terminal; and
   current level indicator comprising:
   (a) a current sensor connected between the line and load terminals, and providing a sensor signal corresponding to a magnitude of current flowing between the line and load terminals;
   (b) an amplifier connected to the current sensor to receive the sensor signal and producing a first output signal in response thereto;
   (c) a first light emitter coupled to the amplifier and being energized by the first output signal;
   (d) a first comparator coupled to the amplifier and producing a second output signal when the first output signal exceeds a first voltage level;
   (e) a second light emitter coupled to the first comparator and being energized by the second output signal;
   (f) a second comparator coupled to the amplifier and producing a third output signal when the first output signal exceeds a second voltage level; and
   (g) a third light emitter coupled to the second comparator and being energized by the third output signal.

2. The circuit breaker as recited in claim 1 wherein the current sensor comprises a first resistor coupled in series with the switch contacts between the line terminal and the load terminal, and having a first lead and a second lead.

3. The current level indicator as recited in claim 2 wherein said amplifier comprises:
   a first transistor having a base, an emitter and a collector;
   a second resistor;
   a first diode connected in series with the second resistor between the base of the first transistor and the first lead of the first resistor;
   a third resistor connected between the emitter of the first transistor and the first lead of the first resistor;
   a second transistor having a base, an emitter and a collector;
   a fourth resistor;
   a second diode connected in series with the fourth resistor between the base of the second transistor and the second lead of the first resistor;
   a fifth resistor connected between the emitter of the second transistor and the second lead of the first resistor; and
   an operational amplifier having a first input connected to the collector of the first transistor, a second input connected to the collector of the second transistor, and an output at which the first output signal is produced.

4. The circuit breaker as recited in claim 3 wherein said amplifier further comprises a sixth resistor, a seventh resistor and a potentiometer connected in series between the first and second inputs of the operational amplifier, with the potentiometer having a wiper connected to ground.

5. The circuit breaker as recited in claim 2 wherein the amplifier comprises an operational amplifier with a two inputs; a second resistor coupling the first lead to one input; a third resistor coupling the second lead to another input; and a fourth resistor coupling the first lead to ground.

6. The circuit breaker as recited in claim 1 wherein the first, second and third light emitters are light emitting diodes.

7. The circuit breaker as recited in claim 1 wherein light produced by the first light emitter varies in intensity with variation of the first output signal.

8. The circuit breaker as recited in claim 1 wherein the sensor signal provided by the current sensor is an electric signal which varies in proportion to the level of current instantaneously flowing between the line and load terminals.

9. The circuit breaker as recited in claim 1 wherein the first output signal provided by the amplifier is an electric signal which varies in proportion to the level of current instantaneously flowing between the line and load terminals.

10. A circuit breaker comprising:
    a line terminal;
    a load terminal;
    a switch coupling the line terminal to the load terminal; and
    current level indicator comprising:
    (a) a current sensing resistor with a first lead coupled to the line terminal and a second lead coupled to the load terminal, wherein a voltage across the current sensing resistor corresponds to a magnitude of current flowing between the line and load terminals;

an amplifier connected to the current sensing resistor and producing a first output signal which varies in response to variation in the voltage;

a first light emitter coupled to the amplifier and being energized by the first output signal to produce light having an intensity that varies in proportion to the magnitude of current flowing between the line and load terminals;

a reference voltage source which produces a first reference voltage and a second reference voltage;

a first comparator coupled to the amplifier and to the reference voltage source for producing a second output signal when the first output signal exceeds the first reference voltage;

a second light emitter coupled to the first comparator and being energized by the second output signal;

a second comparator coupled to the amplifier and to the reference voltage source for producing a second output signal when the first output signal exceeds the second reference voltage; and a third light emitter coupled to the second comparator and being energized by the third output signal.

11. The circuit breaker as recited in claim 10 wherein the first light emitter produces light which varies in intensity with variation of the first output signal.

12. The circuit breaker as recited in claim 10 wherein said amplifier comprises:

a first transistor having a base, an emitter and a collector;

a first resistor;

a first diode connected in series with the first resistor between the base of the first transistor and the first lead of the current sensing resistor;

a second resistor connected between the emitter of the first transistor and the first lead of the current sensing resistor;

a second transistor having a base, an emitter and a collector;

a third resistor;

a second diode connected in series with the third resistor between the base of the second transistor and the second lead of the current sensing resistor;

a fourth resistor connected between the emitter of the second transistor and the second lead of the current sensing resistor; and an operational amplifier having a first input connected to the collector of the first transistor, a second input connected to the collector of the second transistor, and an output at which the first output signal is produced.

13. The circuit breaker as recited in claim 12 wherein said amplifier further comprises a fifth resistor, a sixth resistor and a potentiometer connected in series between the first and second inputs of the operational amplifier, with the potentiometer having a wiper connected to ground.

14. The circuit breaker as recited in claim 12 further comprising temperature compensation circuit comprising fifth resistor and third diode connected in series between a positive voltage and ground, and a third transistor having a base coupled to a point between the fifth resistor and the third diode and having an emitter-collector conduction path connected between ground and the bases of the first and second transistors.

15. The circuit breaker as recited in claim 10 further comprising a circuit which compensates for changes in resistance of the current sensing resistor due to changes in temperature.

16. The circuit breaker as recited in claim 10 wherein the reference voltage source comprises another resistor and two Zener diodes connected in series between two points of different voltage.

17. The circuit breaker as recited in claim 10 wherein the first output signal provided by the amplifier is an electric signal which varies in proportion to the level of current instantaneously flowing between the line and load terminals.

* * * * *